(12) United States Patent
Goldstein

(10) Patent No.: US 6,940,971 B1
(45) Date of Patent: Sep. 6, 2005

(54) METHOD AND SYSTEM FOR ACTIVATING ECHO SUPPRESSION IN A COMMUNICATIONS NETWORK

(75) Inventor: Peter Goldstein, Thalwil (CH)

(73) Assignee: Siemens Schweiz AG, Zurich (CH)

(*) Notice: Subject to any disclaimer, the term of this patent is extended or adjusted under 35 U.S.C. 154(b) by 0 days.

(21) Appl. No.: 09/308,245

(22) PCT Filed: Jul. 21, 1998

(86) PCT No.: PCT/CH98/00317

§ 371 (c)(1),
(2), (4) Date: May 25, 1999

(87) PCT Pub. No.: WO99/11075

PCT Pub. Date: Mar. 4, 1999

(30) Foreign Application Priority Data

Aug. 21, 1997 (CH) ..................... 1958/97

(51) Int. Cl.[7] .............................................. H04M 9/08
(52) U.S. Cl. ......................... 379/406.01; 379/406.02; 379/406.04; 370/286
(58) Field of Search ................. 379/406.01–406.16, 379/401, 229, 240, 220.01, 219

(56) References Cited

U.S. PATENT DOCUMENTS

| | | |
|---|---|---|
| 5,123,009 A | 6/1992 | Winter |
| 5,130,982 A * | 7/1992 | Ash et al. .................. 370/85.7 |
| 5,764,759 A * | 6/1998 | Hamilton et al. |
| 5,940,393 A * | 8/1999 | Duree et al. |

(Continued)

OTHER PUBLICATIONS

Bocker, P., "Das diensteintegrierende digitale Nachrichten-netz", 3rd Edition (Berlin 1990) pp. 47 & 48, and portion of the Table of Contents.

Eriksson, A., et al., "Ericsson Echo Cancellers—A Key to Improved Speech Quality", Ericsson Review, No. 1, (Jan. 1996).

General Recommendations on Telephone Switching and Signalling, Functions and Information Flows for Services in the ISDN, Recommendations Q115(1989), CCITT, GENF, CH Xp002102227.

*Primary Examiner*—Sinh Tran
*Assistant Examiner*—Ramnandan Singh
(74) *Attorney, Agent, or Firm*—Laurence A. Greenberg; Werner H. Stemer; Ralph E. Locher

(57) ABSTRACT

A method for allocating echo canceling devices in a telecommunications network having at least two networks connected to one another by network switching nodes. The network switching nodes have trunk groups interconnecting the networks so that connected terminal devices can be connected to one another. Devices for canceling echo are provided in the networks and can be requested and, if certain criteria are fulfilled, inserted into existing connections to cancel echo signals. The method includes marking selected trunk groups originating from or leading to another network with an echo cancellation mark characteristic, and providing available echo canceling devices based upon the echo cancellation mark characteristic when echo canceling is requested for a connection being set up through one of the selected trunk groups. A system for allocating echo canceling devices in a telecommunications network is also provided.

12 Claims, 4 Drawing Sheets

U.S. PATENT DOCUMENTS

| | | | |
|---|---|---|---|
| 5,987,098 A | * | 11/1999 | Wintour |
| 6,023,470 A | * | 2/2000 | Lee et al. |
| 6,055,311 A | * | 4/2000 | Dreyfert et al. |
| 6,122,294 A | * | 9/2000 | Hsu et al. .................. 379/67.1 |
| H001885 H | * | 10/2000 | Pruett et al. ........... 379/406.01 |
| H1885 H | * | 10/2000 | Pruett et al. |
| 6,151,315 A | * | 11/2000 | Ash et al. ................... 370/352 |
| 6,151,390 A | * | 11/2000 | Volftsun et al. |
| H1941 H | * | 2/2001 | Hoffpauir et al. |
| 6,304,655 B1 | * | 10/2001 | Meek |
| 6,335,927 B1 | * | 1/2002 | Elliott et al. |
| 6,388,770 B1 | * | 5/2002 | Kenmochi et al. |
| 6,404,887 B1 | * | 6/2002 | Born et al. |

* cited by examiner

METHOD AND SYSTEM FOR ACTIVATING ECHO SUPPRESSION IN A COMMUNICATIONS NETWORK

BACKGROUND OF THE INVENTION

1. Field of the Invention

A method for allocating echo canceling devices in a telecommunications network having at least two networks connected to one another by network switching nodes having trunk groups leading to other networks, through which networks connected terminal devices can be connected to one another. Devices for canceling echos are provided in the networks. The devices can be requested and, if certain criteria are fulfilled, inserted into existing connections in order to cancel echo signals. The method includes marking selected trunk groups originating from or leading to another network with an echo cancellation mark (ecm) characteristic; and providing available echo canceling devices based upon the ecm characteristic when echo canceling is requested for a connection being set up through one of the selected trunk groups.

2. Discussion of Background Information

As is generally known, echo signals occur in telecommunications networks, which are undesirable when the transmission time of the echo exceeds a certain value and therefore disturbs users currently communicating. The echo signals occur because of unavoidable reflections in 2-wire/4-wire transmission in the hybrid circuit or because of direct acoustic coupling in the subscriber's terminal. In order to reduce or completely eliminate echo signals in connections having relatively long transmission times, network operators provide devices for echo suppression, such as echo suppressors or echo cancelers, in certain switching nodes, which are activated and inserted into the connection when necessary.

Echo suppression logic in the switching nodes uses various criteria to decide whether a device for echo suppression needs to be inserted for a particular connection. These criteria include:

- permanently programmed routing data with information about the distance (and therefore the transmission time) between the source and the destination of a connection, whereby the device for echo suppression is inserted when a certain distance is exceeded,
- the transmission time of the useful signal, which is dynamically determined when a connection is set up,
- information concerning the terminal device/connection (with or without an echo source), i.e., data that give information about whether or not an echo will occur in a given connection, and
- information received from other switching nodes involved in setting up a connection about the allocation of devices for echo suppression.

In this method, the echo suppression logic attempts to activate a device for echo suppression located as near to the source of the echo as possible.

According to ITU (International Telecommunications Union) Rec. Q.115(97), two possibilities for allocating devices for echo suppression are provided, namely, on one hand, the dedicated assignment of devices for echo suppression to transmission paths and/or trunk groups and, on the other hand, the arrangement of several devices for echo suppression in a pool. In both cases a device for echo suppression will be activated when needed by a control signal from the switching nodes, where, as per ITU Rec. Q115(97), the "technical" criteria mentioned above are the controlling factors. Allocating devices for echo suppression requires the network operator to make significant additional investments in his or her network, which is why he will only provide as many of these devices as are absolutely necessary. In view of the constantly increasing percentage of non-voice services, the allocation of devices for echo suppression in a pool would be the most economical. But the possibility cannot be excluded that network operators who use networks belonging to other network operators to set up connections, intentionally or unintentionally (by sending out information that has been manipulated and is relevant for the echo suppression logic), also use the other network's devices for echo suppression without authorization and can therefore save on investments for devices of this sort in their own network. With the breaking up of the monopolistic structure, the network operators are engaging in increasingly intense competition with one another, which is why the economic factor is increasingly important to the network operators. Therefore, the unauthorized use by other network operators of a network operator's resources, such as the devices for echo suppression, must be prevented.

SUMMARY OF THE INVENTION

An object of this invention is therefore to describe a method that allows a network operator to specifically make the devices for echo suppression in his or her network available only to certain connections passing through his or her network.

This object is achieved in that the method includes marking selected trunk groups originating from or leading to another network with an ecm characteristic; and providing available echo canceling devices based upon the ecm characteristic when echo canceling is requested for a connection being set up through one of the selected trunk groups.

Thus, according to the present invention, a method is provided for allocating echo canceling devices in a telecommunications network having at least two networks connected to one another by network switching nodes. The network switching nodes have trunk groups interconnecting the networks so that connected terminal devices can be connected to one another. Devices for canceling echo are provided in the networks and can be requested, and if certain criteria are fulfilled, inserted into existing connections to cancel echo signals. The method includes marking selected trunk groups originating from or leading to another network with an ecm characteristic, and providing available echo canceling devices based upon the ecm characteristic when echo canceling is requested for a connection being set up through one of the selected trunk groups present in the network.

Echo canceling devices may be provided in the switching nodes of a network and may be inserted into the applicable connection when echo canceling is requested. Alternatively, echo canceling devices are provided in a central station of a network and are inserted into the applicable connection when echo canceling is requested.

The method may also include marking the trunk groups with the ecm characteristic based upon which network operator owns the network from which a trunk group originates and/or which network operator owns the network to which a trunk group leads.

The request may originate from a calling party's network during call setup or when echo canceling becomes necessary due to a change in the preexisting connection configuration. Alternatively, or in addition, the request may originate from a receiving party's network during call setup or when echo canceling becomes necessary due to a change in the preexisting connection configuration.

According to another embodiment, the method includes summing the transmission times between the switching nodes employed in the connection, and sending the sum from a destination point exchange to an originating point exchange, after connection setup. The method also includes determining whether echo canceling is necessary based upon the sum, and determining whether to provide an echo canceler based upon a previous examination of the ecm characteristic, when the sum indicates echo canceling is necessary.

According to another aspect of the present invention, a system is provided for allocating echo canceling devices in a telecommunications network. The system includes a first network comprising a first gateway and an outside network comprising a second gateway connected to the first gateway with a plurality trunk groups. Also included are a plurality of terminal devices, at least one terminal device being located in the first network and at least one terminal device being located in the outside network. The terminal device in the first network is connected to the terminal device in the outside network via a selected one of the plurality of trunk groups. The system further includes a plurality of echo canceling devices. An echo canceling device is inserted into the connection between the terminal device in the first network and the terminal device in the outside network when the selected trunk group is marked with an ecm characteristic.

According to an embodiment, at least one of the plurality of echo canceling devices is attached to each trunk group. Alternatively, or in addition, the system includes an echo suppression station that may include a plurality of echo devices provided in a centralized pool so that each gateway has access to an echo device.

Using the method according to the invention, a network operator has a simple option, through labeling of trunk groups, to authorize certain connections incoming from or outgoing to other networks to use his or her devices for echo suppression and to forbid unauthorized use. For example, he can make the use of his or her own devices for echo suppression dependent on which adjacent network the connection originates from and/or leads to. He can make authorization dependent on the payment of a usage fee by the operator of the other network or on other conditions. Other advantages of this method become clear from the following description.

BRIEF DESCRIPTION OF THE DRAWINGS

The invention is described in greater detail in the following exemplary embodiments with reference to drawings. They show.

DETAILED DESCRIPTION OF THE INVENTION

Figure 1:
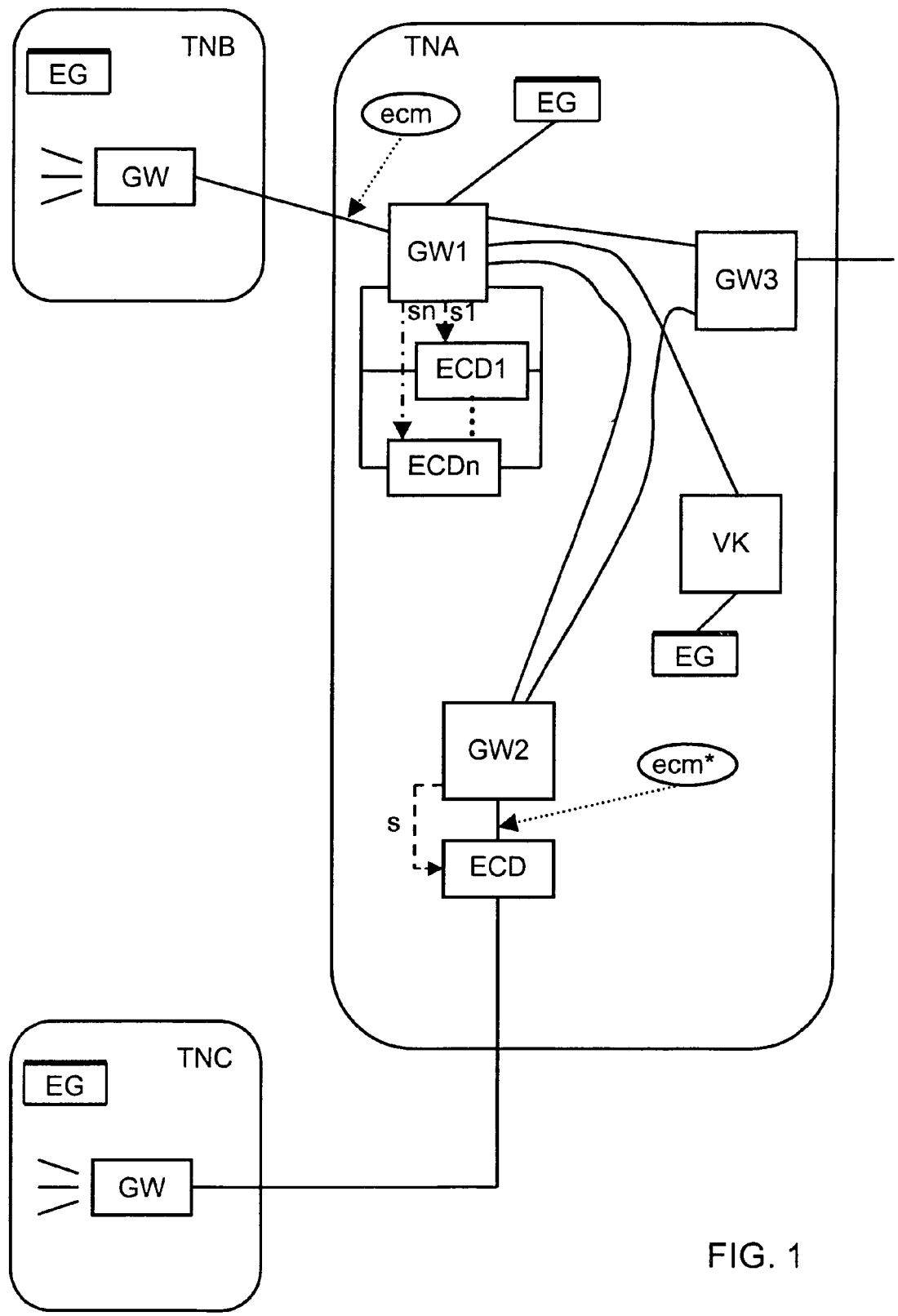
FIG. 1: Networks belonging to different network operators connected in a communications network.

FIG. 1 shows a section of a communications network having three networks TNA, TNB, and TNC, which belong to different network operators and are operated and maintained by their respective operators. The connections between the elements of the networks in FIGS. 1 and 3, which are represented by solid lines, include both data channels and signaling channels. Communication terminal units EG belonging to a network are connected to the network by switching nodes VK or GW. Communication terminal units belonging to different networks can set up communication connections with one another, whereby these connections run either directly from one network to the other or through one or more intervening networks. This is made possible by interconnecting the networks at so-called interconnection points having a network gateway GW, which perform the necessary adaptations, such as for signaling, between networks. More information about these gateways can be found in "Peter Bocker, ISDN—Das diensteintegrierende Nachrichtennetz, $3^{rd}$ Edition (Berlin 1990)" [Bocker, Peter, "ISDN: The Service-Integrating News Network"], among other places on page 47. A network TN has one or more network gateways GW to other networks TN. The network gateways between two networks are connected to one another by a trunk of dedicated lines. In FIG. 1, the network TNA has three network gateways GW1 . . . GW3. The switching functions in the network gateways GW1 and GW2 of the partial network TNA allow connections to be made to the network TNB or to the network TNC over lines in the respective trunk groups. The network gateway GW3 is connected to another network that is not shown.

In the network gateways GW, i.e., in switching nodes with trunk groups connected to other networks, devices for echo suppression ECD are provided, which can be inserted into a connection in order to control the undesired echo signals mentioned at the outset. The allocation of devices for echo suppression ECD can occur in two ways: the devices can be dedicated to one line, as is shown in FIG. 1 for the network gateway GW2 of the network TNA. But as is shown in FIG. 1 for the network gateway GW1 of the network TNA, the devices for echo suppression can also be activated in a pool with several devices for echo suppression ECD1 . . . ECDn. When needed, i.e., when echo suppression is required during the course of setting up a connection passing through the gateway GW1 of network TNA, the dedicated device for echo suppression ECD is activated and/or one of the devices for echo suppression ECD1 . . . ECDn from the pool is inserted into the proper connection and activated. Activation occurs through a control signal s. Principles for the allocation and operation of devices for echo suppression in communications networks are recommended in ITU Rec. Q.115 (97) "Logic for the Control of Echo Suppression Devices" and its Appendix A.

Proceeding from ITU Rec. Q.115(97), provision is made according to the invention for certain trunk groups connected to network gateways GW for connecting to the second network to be marked with an ecm characteristic. The marking occurs in a memory that contains the rest of the trunk group data that are necessary for setting up the connection. The ecm characteristic represents an expansion of the usual function of a network gateway GW. It determines whether or not to make any existing devices for echo suppression available to connections passing through a trunk group. The network operator thus has the opportunity to provide use of the available devices for echo suppression in his or her network specifically to those connections passing through his or her network or originating in an outside network (i.e., network operated by another network operator) or going to another network that fulfill certain conditions. Thus, he can make the allocation of devices for echo suppression depend on, for example, which adjacent network the connection in question originates from and/or terminates at.

No devices for echo suppression are made available to the connections that pass through trunk groups marked with the ecm characteristic. Naturally, a reverse arrangement of this is also possible in which one device for echo suppression would be provided to each trunk group marked with the ecm characteristic. If any of the factors change, the ecm characteristic can be deleted without any problem.

In FIG. 1, for example, in the network TNA, the trunk group leading to network TNB has been marked with an ecm characteristic. Therefore, if a request is made and/or an need is recognized for an device for echo suppression to be activated in the course of setting up a connection from or to network TNB, devices for echo suppression in network TNA are not allocated and any information that arrives and is relevant for the echo suppression logic is transmitted to network TNB. On the other hand, the trunk group leading to network TNC is not marked with an ecm characteristic (represented in FIG. 1 by "ecm*"), for which reason devices for echo suppression will be allocated to connections arriving by way of this trunk group if requested. Although it is not shown in FIG. 1, trunk groups in networks TNB and TNC leading to and from other networks can also be marked with the ecm characteristic.

An ecm characteristic that has been set affects both directions of a connection, in other words to an outside network and from an outside network. In regard to network TNA in FIG. 1, networks TNB and TNC are "outside" networks.

Figure 2A:
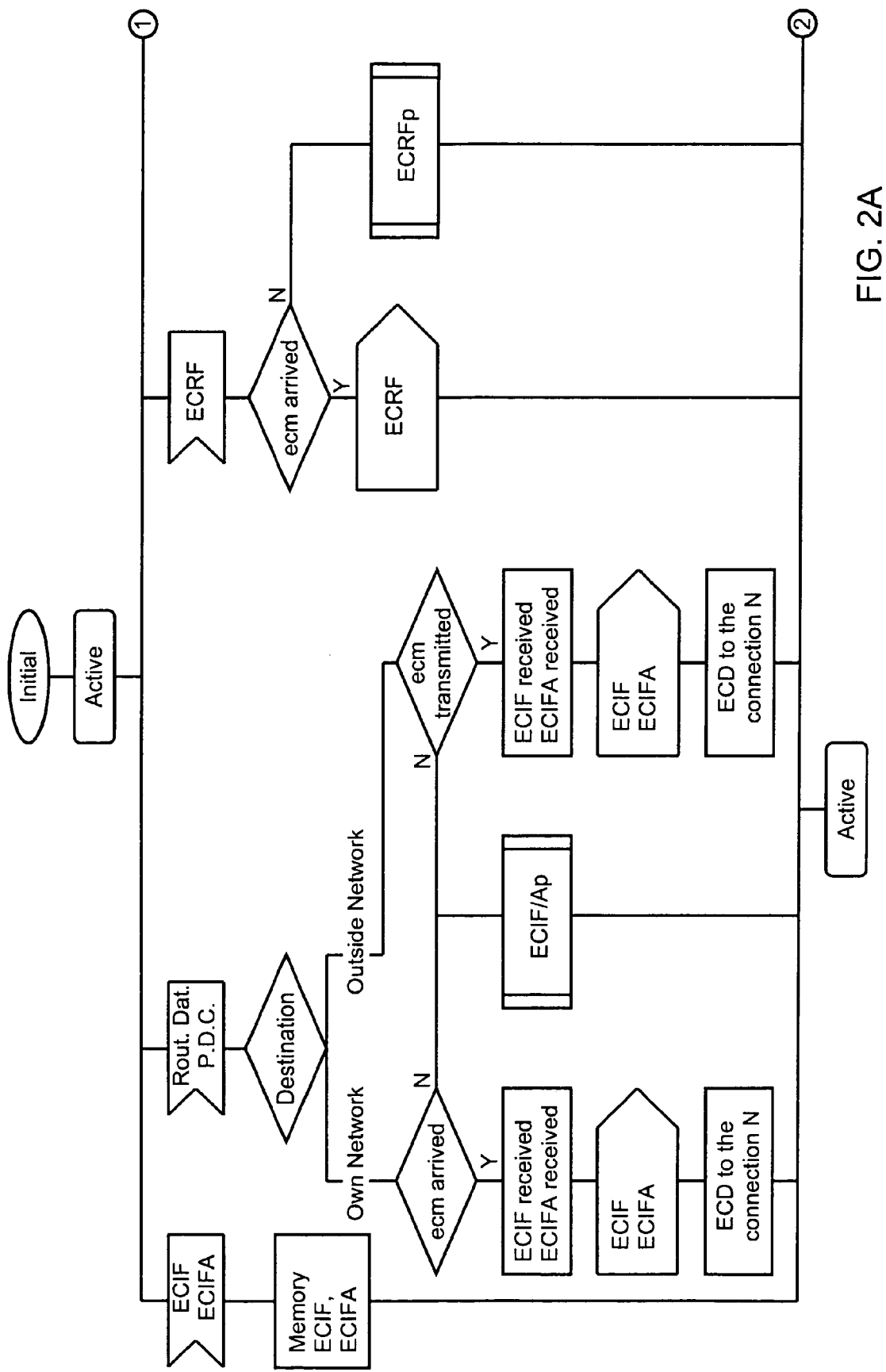
FIGS. 2a and 2b: Details on the process sequence.
Figure 2B:
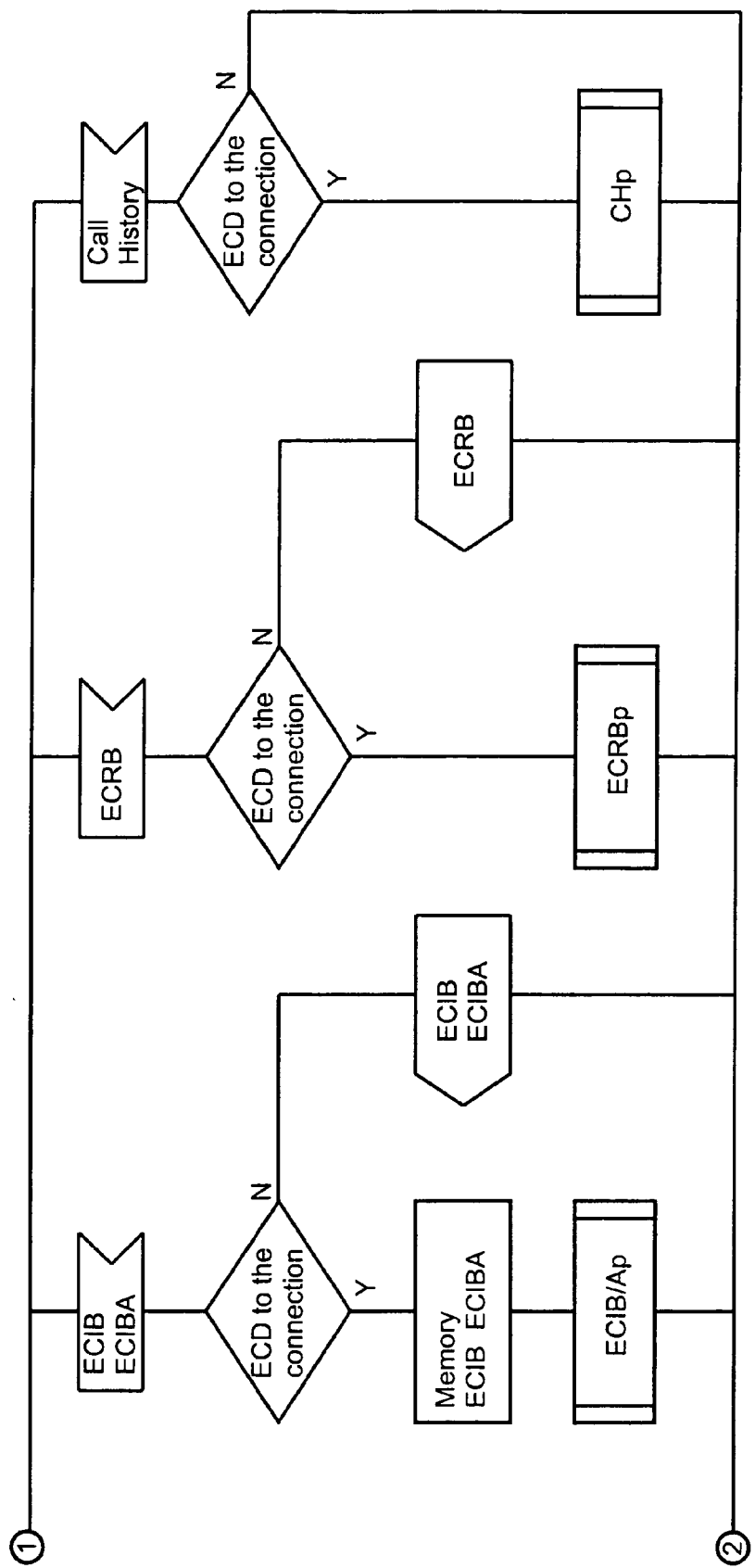

FIG. 2 (consisting of partial FIGS. 2a and 2b) shows details on the process sequence in the echo suppression logic of a network gateway in an SDL diagram. The figure is based on the representation known from ITU Rec. Q.115(97) and also contains the relevant process steps in connection with the invention, which are shaded grey for the purpose of clarity. For the purpose of simplicity, the same designations are used as in ITU Rec. Q.115(97).

When a connection is set up over a communications network, the known connection information as well as the information relevant for the echo suppression logic is transmitted. As per ITU Rec. Q.115(97), the following echo suppression information is provided:

ECIF: Echo Control Information Forward
ECIB: Echo Control Information Backward
ECRF: Echo Control Request Forward
ECRB: Echo Control Request Backward
ECIFA: Echo Control Information Forward, Additional
ECIFB: Echo Control Information Backward, Additional The ECIF, ECIFA, ECIB, and ECIBA information are components of the connection setup information and are transmitted every time a connection is set up. ECIF and ECIFA are transmitted in the direction of the connection (from the calling to the receiving user), and ECIB and ECIBA are transmitted in the opposite direction. On the other hand, ECRF and ECRB appear as a rule only when echo canceling becomes retroactively necessary in a preexisting connection as a result of a change in a preexisting connections configuration (such as in the Intelligent network service "Follow-On").

When a connection is made to an adjacent (outside) network, ECIF and ECIFA information that arrives is saved in the echo suppression logic, located, for example, in the network portal, abbreviated in the following as "logic circuit," and the information remains saved until the connection is terminated. The logic circuit determines from the rest of the routing data which network the requested connection will terminate in. This will have one of two outcomes:

1. The point of termination is located in the same network.
2. The point of termination is located in another network, i.e., an outside network.

The second outcome will occur when a connection is established from the same network to an outside network or when a connection passes through a network.

In the first case, the logic circuit ascertains whether the trunk group through which the connection is arriving has an ecm characteristic. If this is the case, no devices for echo suppression are provided and the received ECIF and ECIFA information has no effect. The information is transmitted unchanged to the next switching node in the same network. Furthermore, data is saved in the logic circuit to the effect that no devices for echo suppression are to be allocated to this connection in future connection configurations. On the other hand, if no ecm characteristic is set, the logic circuit handles the ECIF and ECIFA information using the ECIF/Ap procedure according to ITU Rec. Q.115(97), i.e., it activates a device for echo suppression if available and provides it to the connection in question.

In the second case, the logic circuit ascertains whether the trunk group through which the connection that is passing through the network to a termination point in another network has an ecm characteristic. If this is the case, no devices for echo suppression are provided. The received ECIF and ECIFA information has no effect and is transmitted unchanged to the neighboring network. Furthermore, data is saved in the logic circuit to the effect that no devices for echo suppression are to be allocated for this connection in future connection configurations. On the other hand, if no ecm characteristic is set, the logic circuit processes the ECIF and ECIFA information using the ECIF/Ap procedure according to ITU Rec. Q.115(97), i.e., it activates a device for echo suppression if available.

If ECIB or ECIBA information arrive in the network gateway at a later time in the course of the connection setup described above, the logic circuit determines whether earlier examination has already decided if an device for echo suppression should be made available. If this does not apply, the ECIB and ECIBA information has no effect and is forwarded unchanged. If, on the other hand, a device for echo suppression is to be made available, this information is processed using the procedure ECIB/Ap according to ITU Rec. Q.115(97).

If ECRF information arrives in the network portal, for example, when setting up a Follow-On connection from a preexisting connection, the logic circuit determines again whether an ecm characteristic is set for the trunk group through which the connection is arriving. If so, no devices for echo suppression are provided and the information is forwarded unchanged. On the other hand, if no characteristic is set, the logic circuit processes the ECRB information using the ECRFp procedure according to ITU Rec. Q.115(97) and allows access to a device for echo suppression if available.

If ECRB information arrives in the network from a certain configuration of a preexisting connection, the logic circuit already knows whether or not to make a device for echo suppression available to the connection because of the current connection setup. If not, the information is forwarded unchanged. If so, the ECRB information is processed using the ECRFp procedure according to ITU Rec. Q.115(97) and a device for echo suppression is provided if available.

When a connection is set up, the transmission times between the switching nodes involved in the connection are summed up and the result (call history) is sent from the destination point exchange to the originating exchange after connection setup is completed. If the use of devices for echo suppression becomes necessary because of the transmitted transmission information, the logic circuit first determines whether or not to provide such a device based on earlier examination of the ecm characteristic. If not, the information relevant for the echo suppression logic has no effect and no devices for echo suppression are provided. If so, the information relevant for the echo suppression logic is processed using the procedure CHp according to ITU Rec. Q.115(97) and a device for echo suppression is provided if necessary.

Figure 3:
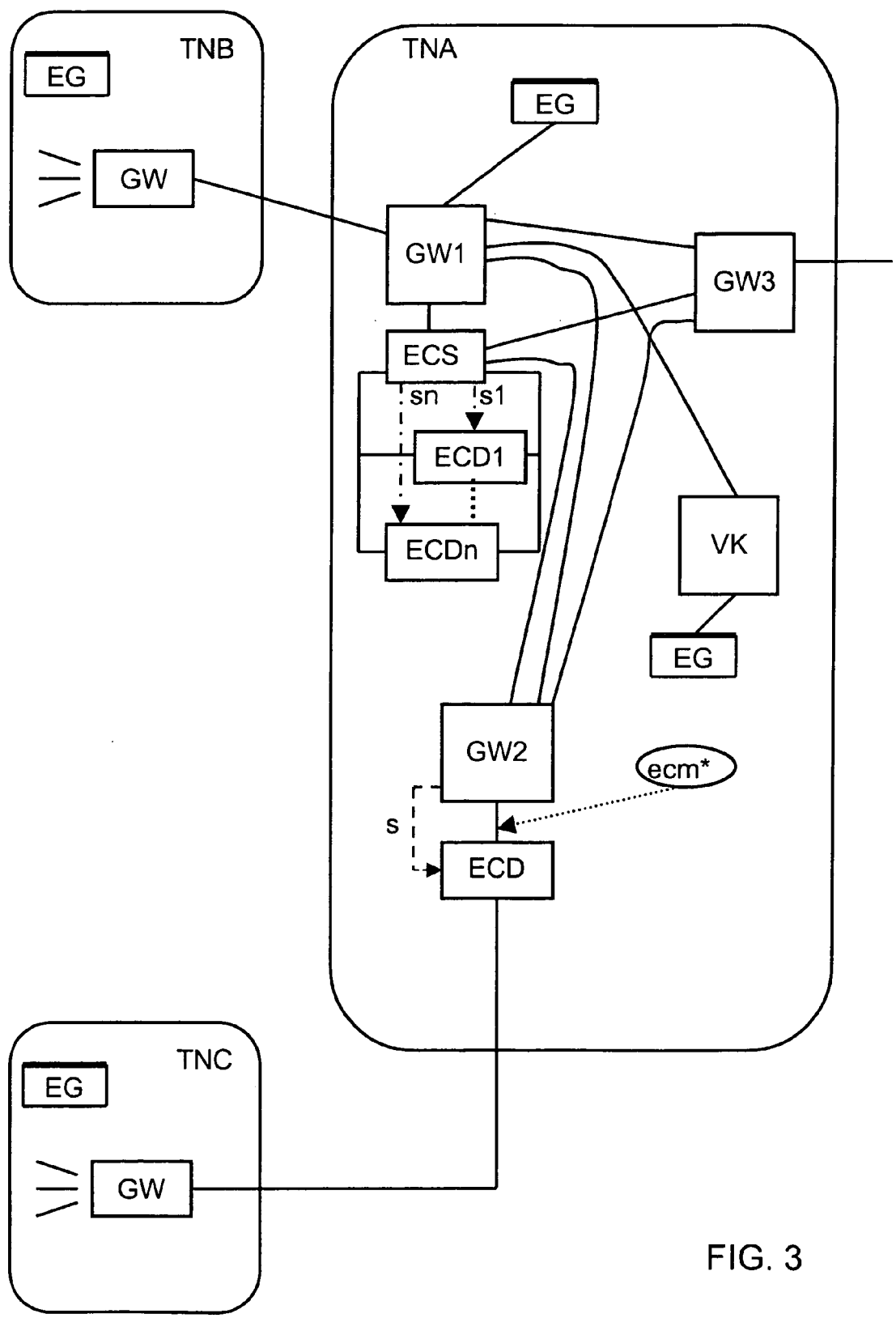
FIG. 3 illustrates networks belonging to different operators connected in a communication network.

In the example described in connection with FIG. 1, the devices for echo suppression ECD provided in network TNA in the network portal GW1 are arranged in a pool and in network portal GW2 they are firmly attached to a trunk group. For various reasons, such as economy or special needs of the network architecture, the devices for echo suppression ECD belonging to a network can instead be arranged centrally as shown in FIG. 3. Here the network portals GW1–GW3 belonging to network TNA are connected to a central device for echo suppression, station ECS, in which several devices for echo suppression ECD1–ECDn are available. The method described above in connection with FIG. 2 can also be used in this type of arrangement:

If gateway GW1 belonging to network TNA receives a connection request from network TNB that contains a request for a device for echo suppression, the data "ecm" or "ecm*," depending on the presence or absence of an ecm characteristic, is sent along with the rest of the connection information to the central device for echo suppression station ECS. The information is then evaluated according to the progression diagram shown in FIG. 2 by echo suppression logic located there, which, if required, inserts a device for echo suppression ECD from the central device for echo suppression station ECS into the connection.

What is claimed is:

1. A method for providing echo canceling devices in a connection via a circuit switched telecommunications network having at least two differently owned networks connected to one another by network switching nodes having trunk groups interconnecting the networks, the method which comprises:
   in a first network, marking selected trunk groups originating from or leading to another network with an echo cancellation mark characteristic indicating the authorization for providing an echo canceling device;
   basing the marking upon a relationship between the owner of the first network and the owner of the other network from which a trunk group originates or to which a trunk group leads; and
   providing the echo canceling device when it is indicated as being needed, only for a connection being set up through one of the selected trunk groups containing the echo cancellation mark characteristic.

2. The method of claim 1, further including marking the trunk groups with the echo cancellation mark characteristic independent of any technical requirement of echo cancellation for a connection.

3. The method according to claim 2, further comprises inserting the echo canceling device in the switching nodes of a network.

4. The method according to claim 2, further comprises originating a request for echo canceling for the connection from a calling party's network.

5. The method according to claim 4, further comprises originating the request when echo canceling becomes necessary due to a change in the preexisting connection configuration.

6. The method according to claim 2, further comprises originating a request for echo canceling for the connection from a receiving party's network.

7. The method according to claim 6, further comprises originating the request when echo canceling becomes necessary due to a change in the preexisting connection configuration.

8. A system for allocating echo canceling devices in a circuit switched telecommunications network, comprising:
   a first circuit switched network having a first gateway, said first circuit switched network being operated by a first operator;
   a second circuit switched network having a second gateway connected to the first gateway with a plurality trunk groups, said second circuit switched network being operated by a second operator different from said first operator;
   a plurality of terminal devices, at least one terminal device being located in the first network and at least one terminal device being located in the second network, the terminal device in the first network being connected to the terminal device in the second network via a selected one of the plurality of trunk groups;
   an echo canceling device connected between the terminal device in the first network and the terminal device in the second network, said echo canceling device being activated only if and when the selected trunk group is marked with an echo cancellation mark characteristic authorizing activation of said echo canceling device; and
   said echo cancellation mark characteristic only being applied to said selected trunk group based upon a relationship between said first operator and said second operator.

9. The method of claim 8, further including marking the trunk groups with the echo cancellation mark characteristic independent of any technical requirement of echo cancellation for a connection.

10. The system according to claim 9, wherein said echo canceling device is one of a plurality of echo canceling devices, and at least one of said plurality of echo canceling devices is attached to each trunk group.

11. The system according to claim 9, further comprising an echo suppression station.

12. The system according to claim 11, wherein the echo suppression station has a plurality of echo devices provided in a centralized pool so that each gateway has access to an echo device.

* * * * *